May 16, 1944.   A. G. PEKAR   2,348,922
SYSTEM FOR INDICATING UNBALANCE OF CYCLICALLY MOVING BODIES
Filed April 7, 1943   2 Sheets-Sheet 1
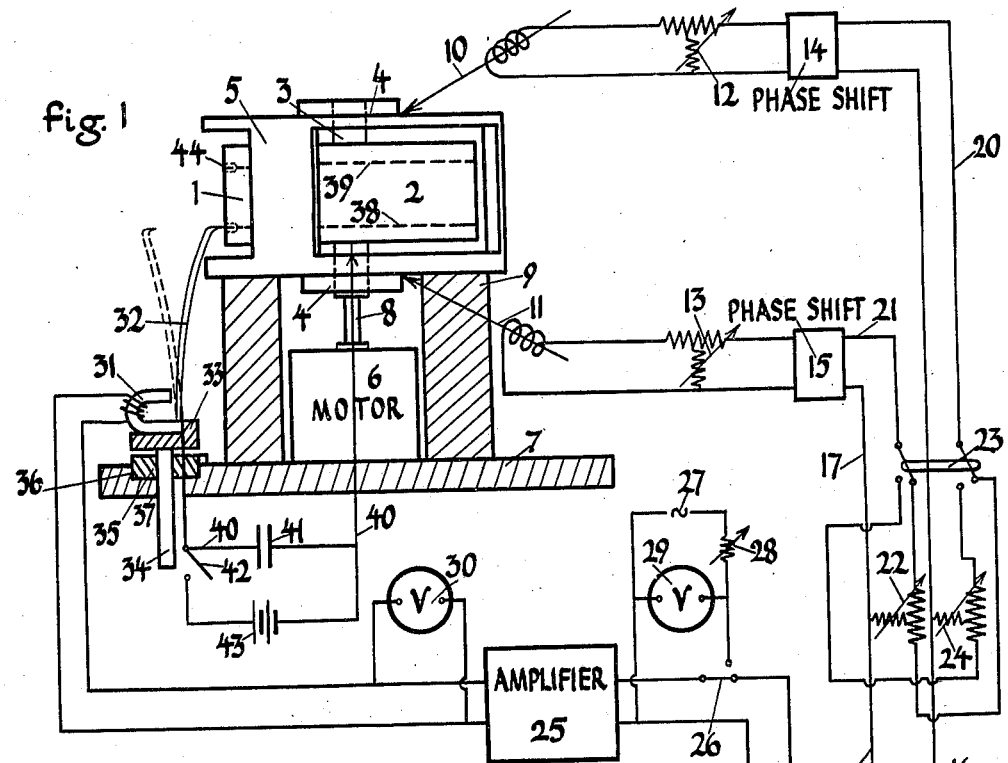
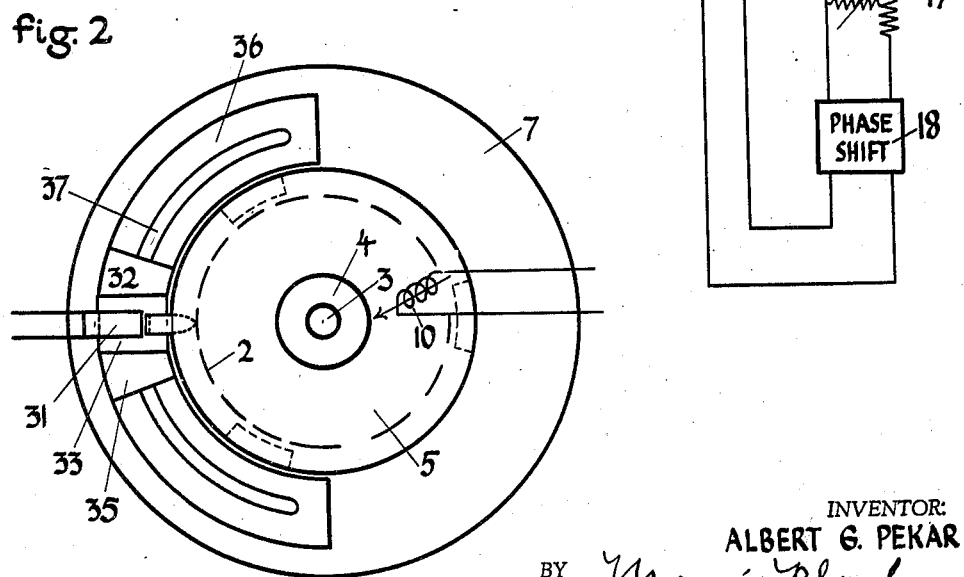
INVENTOR:
ALBERT G. PEKAR
BY Maurice Block
ATTORNEY.

May 16, 1944.   A. G. PEKAR   2,348,922
SYSTEM FOR INDICATING UNBALANCE OF CYCLICALLY MOVING BODIES
Filed April 7, 1943   2 Sheets-Sheet 2
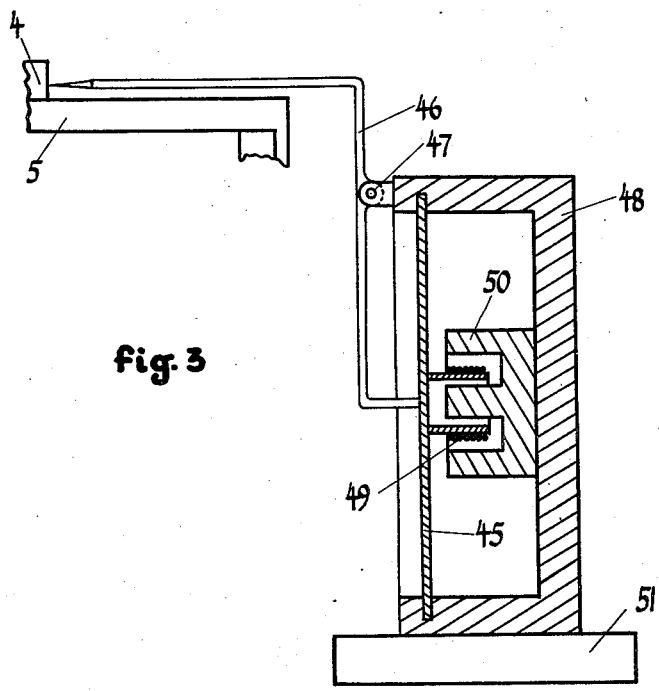
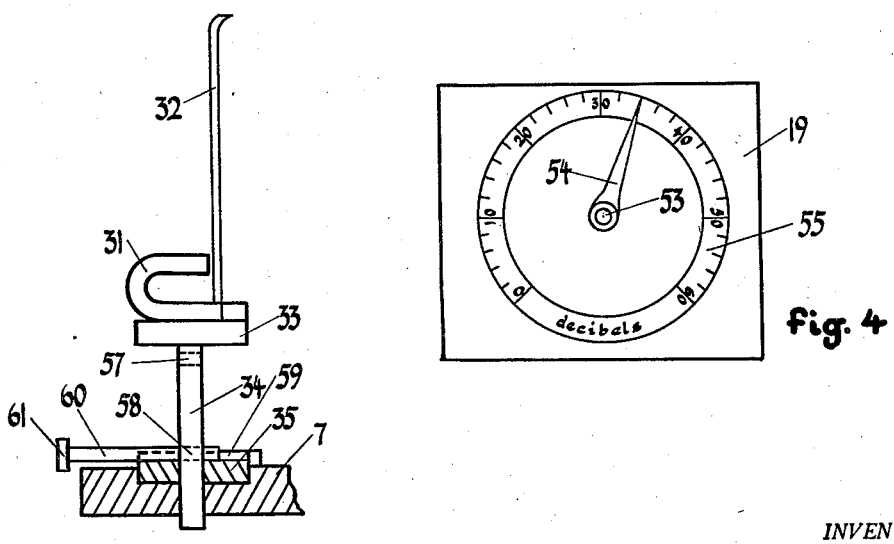
INVENTOR:
ALBERT G. PEKAR
BY Maurice Block
ATTORNEY.

UNITED STATES PATENT OFFICE 2,348,922

SYSTEM FOR INDICATING UNBALANCE OF CYCLICALLY MOVING BODIES

Albert G. Pekar, Ridgefield Park, N. J., assignor to George Sharpnack, Ridgefield Park, N. J.

Application April 7, 1943, Serial No. 482,180

7 Claims. (Cl. 73—53)

My invention relates to the balancing of cyclically moving bodies or machine parts which should be free of unbalance or should have such a distribution of weight or material that the cyclic movement does not cause unilateral inert forces or vibrations. Cyclic movement means either rotation or reciprocation or any combination of rotation and reciprocation. In the case of a reciprocating movement, inert forces or vibrations may occur in the direction of the movement when this direction reverses, even if the body is perfectly balanced or has a distribution of weight symmetrical to the direction of the moving force. In this case, my invention is concerned only with additional vibrations or with inert forces in other directions which may result from unbalance or from unsymmetrical distribution of weight.

In any case, the cyclic movement has a frequency defined by the number of cycles made by the body in the unit of time.

An unbalance may result from differences in the density of the material, from inaccuracies of the manufacture or from any other cause. The unbalance can be corrected, or the body can be balanced, for example, by eliminating material from certain spots or by adding material to certain spots or by shifting the body relatively to its moving axis. Such corrections can be made properly and efficiently if the location of the unbalance is exactly known. Objects of my invention are to procure this knowledge, to locate any existing unbalance and to make possible or to facilitate the correction of the unbalance.

A further requirement for accurate, quick and efficient correction of unbalance is the knowledge of its magnitude. So, a further object is to determine or to measure the amount of any existing unbalance.

Mechanical science teaches that the dynamic unbalance of a body is fully defined by two overweights located in two different planes perpendicular to the axis of movement, said axis containing the center of gravity of the body if the overweights are balanced. The planes and the distances of the defining overweights from the axis may be selected arbitrarily. But for the sake of accuracy and convenience, I prefer to select two planes near the ends of said axis and points at the surface of the body. In any case of unbalance, a definite amount of weight at each of said two points will represent the total unbalance. Objects of my invention are to find these points of unbalance on two surface lines located in two different planes perpendicular to the axis of the body, and to measure the amount of unbalance regarded as concentrated in these points.

It appears from the foregoing that indicating unbalance is an object of my invention, and that the term "indicating" means either locating or measuring or both. Other objects are to obtain this indication by reliable, accurate, simple and inexpensive means, to provide such means for adjustment to different bodies or to different ranges of unbalance, and to provide such means for suitable calibration of the indication.

Further objects are to make the indication clearly and immediately visible, to mark the points of unbalance on the surface of the body, and to make these marks accurate, fine, clear and ineffaceable.

According to my invention, a reed or another elastically swingable member is tuned to the frequency of the body to be balanced, and means are provided to transmit impulses from the vibrations caused by unbalance to said member. The member is so positioned that an oscillating point thereof directly or indirectly contacts the surface of the body.

More details, the full nature of my invention and further objects and advantages thereof will appear from the following description of an exemplifying embodiment, from the appended claims and from the accompanying drawings in which:

Figure 1 shows a schematic plan of an illustrative embodiment of a device for indicating unbalance according to my invention, some parts being shown in central cross-section, and electrical elements being shown diagrammatically;

Figure 2 shows parts shown in Figure 1, seen from the upper side in Figure 1.

Fig. 3 shows a partly sectional view of a pickup which is shown symbolically in Fig. 1;

Fig. 4 shows a front view with calibrated dial of the attenuator 19 shown in Fig. 1 symbolically;

Fig. 5 shows the means holding the reed, on a larger scale than Figs. 1 and 2, including some details omitted in Figs. 1 and 2.

Referring to the drawings, numeral 1 indicates the body to be balanced. This body has a cylindrical outer metallic surface 2 and rotates around the geometrical axis of this surface, a central shaft 3, forming a part of the body 1, being rotatably supported by bearings 4 of a stationary cage or frame 5. The body or rotor 1 is driven by any suitable means, for example, by an electromotor 6 mounted co-axially to the rotor 1 on a base plate or table 7 and connected to the shaft 3 by a flexible shaft 8. If the body 1 is the rotor of a motor or comprises a motor, the stator of this motor may serve as cage 5 or may be affixed to the cage 5, and, in this case, separate driving means are not necessary. In any case, the rotor 1 is rotated at a definite frequency, for example, at 10,000 revolutions per minute.

The cage 5 is mounted resiliently, for example, by affixing it to the upper side of a block 9 made of sponge rubber and resting on the base plate 7. Any other kind of resilient support or suspension of the cage 5 which allows the cage to vibrate perpendicularly to the axis of rotation may be used instead of the block 9.

A pickup 10 picks up vibrations from a point near the upper end and a pickup 11 from a point near the lower end of the cage 5. Preferably, these two points are located in the same vertical line. The pickups transform the picked up impulses into alternating currents of the frequency of the vibrations which, in turn, have the frequency of the rotation. These currents are conducted through attenuators 12 and 13 and through phase shift networks 14 and 15 respectively.

The pickups may have any known or suitable structure. For example, each pickup may be a conventional dynamic type microphone (Fig. 3) with a stiff diaphragm 45 to which a stylus 46 contacting a suitable projection or surface of the rotor cage is attached. In the shown embodiment, the stylus 46 has the form of a lever turnable in bearings 47 affixed to the casing 48 of the microphone. One arm of this lever has a bent end affixed to the center of the diaphragm 45. The other arm has a bent end terminating in a pointed tip contacting the bearing 4 of the cage 5 (shown broken off in Fig. 3). The inner side of the diaphragm carries a coil of wire 49 which has ends connected to the circuit as will be seen from Fig. 1. When the diaphragm is oscillated by the vibrations of the cage through the stylus, the coil 49 moves in the magnetic field of a permanent magnet 50 having a central pole extending into the coil 49 and a cup-shaped outer pole surrounding said coil. The casing 48 may be mounted on a fixed ground plate 51.

The output wire 16 of network 14 and the output wire 17 of network 15 form the input wires of a third phase shift network 18 before which an attenuator 19 is arranged. The remaining output wires 20 and 21 of the networks 14 and 15 are connected with each other either over the attenuator 22 which is connected to the wire 17 when the double switch 23 is in the shown position, or over the attenuator 24 which is connected to the wire 16 when the switch 23 is in its other position.

The output of the phase shift network 18 is conducted to an amplifier 25 of any known and suitable structure which is capable of being tuned to pass a relatively small band of frequencies, the tuning being peaked at the frequency of the rotor 1. The amplifier 25 is provided in conventional manner with a gain control permitting adjustment of the gain to obtain sufficient output when the input signal is of small magnitude corresponding to that which is generated in the pickups when the rotor is well balanced.

A switch 26 permits to switch the input of the amplifier 25 from the pickups to a calibration voltage source 27. The calibration voltage circuit contains the variable resistance 28 and is provided with a voltmeter 29. Switching to the calibration circuit permits adjustment of the amplifier gain so that the output of the amplifier will have a predetermined level when a signal of known magnitude is supplied to the amplifier.

The output of the amplifier 25 is connected to a voltmeter 30, preferably of the D'Arsonval type provided with a rectifier in conventional manner. Conductors parallel to this connection feed the output signal to a polarized electromagnet 31 which agitates a reed 32 preferably made of steel. The sensitivity of the D'Arsonval meter 30 is adjusted to produce mid-scale deflection when the reed has the required amplitude of oscillation.

The reed 32 and the magnet 31 are mounted on a plate 33 which can be raised by shifting a rod 34 affixed to the lower side of 33 in a hole provided in another plate 35. The rod 34 has two cross-bores or holes 57 and 58 (Fig. 5). The upper surface of the plate 35 has a groove 59 running in the direction of said holes. A pin or bolt 60 rests in the groove 59 and has a boss or handle 61 whereby said pin can be pushed through either of the holes 57 or 58 and can be withdrawn therefrom. When the pin 60 is pushed through the upper hole 57, the reed 32 and the rod 34 are secured in the position shown in Fig. 1. After the rod 34 together with the plate 33 and the reed 32 has been raised, the pin 60 is withdrawn and shifted into the lower hole 58 whereby the reed is secured in its higher position as shown in Fig. 5. The plate 35 can be shifted horizontally in an arc-shaped groove 36 provided concentrically to the rotor 1 in the base plate 7. The bottom of the groove 36 has a slot 37 for the passage of the rod 34. The plates 33 and 35 can be fixed in any shifted position by suitable and conventional means.

The reed 32 oscillates when agitated by the magnet 31 between the position shown in full lines and the position shown in dotted lines in Figure 1. The position of the reed in the proximity of the rotor 1 and the partly open structure of the cage 5 permits the free end of the reed to contact the cylindrical surface 2 of the rotor in the extreme right position of the reed. In the shown position of the reed, the point of reed contact is diagonally opposite to the contact points of the pickups 10 and 11 and is situated in the horizontal plane 38. In a raised position, the reed will contact the surface 2 at a point situated in the plane 39.

The reed 32 is electrically connected over conducting parts of the rotor 1 to the surface 2 by a circuit 40 interrupted by a condenser 41. Closing of a switch 42 permits charging the condenser 41 from a curent source 43. When the switch 42 is re-opened, the condenser 41 remains charged until contact between the reed and the rotor will close the circuit 40 and discharge the condenser 41 over the point of contact. The discharge current marks the surface 2 at that point where it is contacted by the reed 32.

The described device is adjusted or calibrated as follows: A well balanced rotor 1 is placed in the cage 5. This calibration rotor has two holes 44, each in one of the planes 38 and 39. Then, an overweight, preferably, a screw, is securely inserted into one of said holes whereby an unbalance of known magnitude and location is created. This unbalance causes vibrations of the rotor at the frequency of rotation. The vibrations are transferred to the cage 5 and from the latter to the pickups where they are transformed into alternating currents or signals of the same frequency.

First, the overweight is placed in the hole 44 of the upper plane 39 and the switch 23 is set as shown in Figure 1. The vibrations due to the unbalance created in the plane 39 will be substantial at the upper part of the cage 5 and are picked up by the pickup 10. At the same time, considerably smaller vibrations may occur at the lower part of the cage 5 and may be picked up by 11. The pickups 10 and 11 are so poled that they produce currents approximately 180 degrees out of phase with each other or of opposite phase. If necessary, phase rotating circuits or phase shift devices 14 and 15 are used to insure this phase relationship between the two pickup currents. The switch 23 connects one conductor 20 of the output circuit of pickup 10 with that conductor 21 of the output circuit of pickup 11 which has the opposite phase. The attenuator 22 is used to cancel out any residual signal generated in the pickup 11 as will be described thereafter. The remaining conductors 16 and 17 feed the signal generated in the pickup 10 to the amplifier 25. The attenuator 19 and, eventually, the attenuator 12 are so adjusted that a suitable deflection, preferably a mid-scale deflection is produced in the meter 30 of the amplifier's output circuit. This output circut feeds a signal of predetermined magnitude and of the same frequency and phase as the pickup signal to the electromagnet 31. If necessary, the phase of this signal is adjusted by the phase rotating circuit or phase shift device 18.

The magnet 31 impels the reed 32 in phase with and at the frequency of the rotation or of the picked up vibrations. The reed 32 has such dimensions or is so adjusted that it is tuned to this frequency, and, therefore, oscillates in phase with the rotation of the rotor 1. The reed is so raised that its free end contacts the surface 2 at the level of the plane 39, and the reed or its support plate 35 is so adjusted in the groove 36 that the point of contact marks the point of unbalance or overweight, that is, that the point of contact coincides with the screw inserted in the hole 44. Instead of or in addition to adjusting the plate 35, the phase shift 18 may be so adjusted that the reed contacts the point of unbalance.

Thereafter, the overweight or screw is removed from the upper plane 39 and securely inserted into the other hole located at the lower plane 38. The switch 23 is set into its other position, and the reed is lowered to the level shown in Figure 1. With the unbalance now located in the lower plane 38, the attenuator 13 is so adjusted that the meter 30 shows mid-scale deflection again. The attenuators 12 and 19 are left set as they were before. In this condition, equal amounts of unbalance in the upper and in the lower plane of the rotor 1 produce equal deflections of the meter 30 or equal output currents of the amplifier 25. However, with the principal unbalance in the lower plane 38, some signal may be generated in the upper pickup 10. In order to counteract this, the switch 23 is thrown into the first position shown in Figure 1, and the attenuator 24 is adjusted for minimum reading of the meter 30. Thereby, a portion of the current generated in the pickup 11 is fed into the circuit of the pickup 10, thus cancelling the current generated in 10 when the unbalance is in the lower plane.

Correspondingly, with the unbalance in the upper plane and with the switch 23 in the other position, the attenuator 22 is adjusted for minimum reading of the meter 30.

After these adjustments have been made, the system produces equal amplifier outputs for equal amounts of balance in either of the planes 38 and 39, and the reed marks the spot where the unbalance is located.

The final operation of the system is as follows:

In order to indicate the unknown unbalance of a body, the body is placed into the cage 5 instead of the well balanced rotor used for adjustment and this body or rotor 1 is rotated as described before. Two corresponding tests are made, one with the reed in its upper position and the switch 23 in the position shown in Figure 1, and one with the reed in its lower position and the switch 23 in its other position. During each test, the attenuator 19 is adjusted for mid-scale reading of the meter 30 or for standard output of the amplifier 25, and the amount of this adjustment is read from the dial of the attenuator 19 which preferably may be conveniently calibrated.

The attenuator 19 is a standard T-pad type of constant impedance, provided with a series of discrete steps of progressively increasing attenuation, the constants of the attenuator being so chosen that each succeeding step of attenuation decreases the output voltage in the ratio of two decibels. The actuating shaft 53 (Fig. 4) of the attenuator mechanism 19 shown symbolically in Fig. 1 is equipped with an arm or pointer 54 moving over a scale 55 which is progressively calibrated from 0 to 60 decibels. The magnitude of the generated signal in decibel ratios of voltage, read from the scale 55, is correlated to the magnitude of unbalance, either in units of force created by the existing unbalance or in units of weight required to correct the unbalance or in thousandths of an inch required to drill into the unbalanced object with a definite diameter to correct the unbalance. This correlation is derived from experimental measurements and may be recorded on a table of data.

The system resolves the unknown unbalance into two components, one in each of the planes 38 and 39, one of these components being located by the contact point of the reed and being measured by the adjustment of the attenuator 19 during the first test, and the other component being located and measured in the same way during the second test.

The tests are carried out at a fixed speed or frequency of rotation synchronous with the tune of the reed wherefrom several advantages result. Apparent changes of location of the unbalance which might be due to different speeds of rotation are avoided. The reed is not subject to cyclic variations and tends to be actuated by the average unbalance over several cycles of rotation. The pressure between the pickups and the cage may vary due to the flexible mounting and to variable impedance, and therefrom an apparent shift of the unbalance may result from cycle to cycle of rotation. The tuned reed, however, will integrate these slight cyclic variations and will strike the average which will coincide with the true point of unbalance at a high accuracy.

The marking of the point of unbalance is achieved by having the reed lightly contact the surface of the rotor at the extremity of the reed's vibration whereby the condenser 41 is discharged, this discharge causing a small arc which slightly pits or discolors the surface of the rotor at the point of contact. Thereby a single, precise mark is produced at the point of unbalance at the first contact of the reed, even if the unbalance is very fine, for example in the range of milligrams.

When the two indicated unbalance components are corrected, the body 1 is dynamically balanced. A dynamically balanced body is always also statically balanced. Thus, the same system may be used to indicate what correction is needed if only static balancing is required. In the latter case, the correction is simplified by the fact, that one addition or elimination of weight at any arbitrarily selected plane suffices.

I desire it understood that my invention is not confined to the particular forms and uses shown and described, the same being merely illustrative, and that the invention may be carried out in other ways without departing from the spirit of my invention as it is obvious that the embodiment shown and described is only one of the many that can be employed to attain the objects of my invention.

Having described the nature of my invention and how it operates, what I claim and want to secure by Letters Patent is:

1. A device for indicating unbalance of a cyclically moving body, said device comprising a resiliently mounted cage, means to move said body cyclically in said cage at a definite frequency whereby any unbalance of said body causes vibrations of said cage, an electric circuit, means forming a part of said circuit and transforming said vibrations into electric signals, an electromagnet excited by said circuit and responsive to said signals, and a reed tuned to said frequency, oscillated by said electromagnet and so positioned that said reed contacts said body at its extreme position of oscillation, but does not contact the body at any other position.

2. A device for indicating unbalance of a cyclically moving body, said device comprising a resiliently mounted cage, means to move said body cyclically in said cage at a definite frequency whereby any unbalance of said body causes vibrations of said cage, an electric circuit, means forming a part of said circuit and transforming said vibrations into electrical signals, means to measure the magnitude of said signals, a reed, means actuated by said circuit, responsive to said signals and oscillating said reed, said reed being so positioned that said reed contacts said body at its extreme position of oscillation, but does not contact said body at any other position.

3. A device for indicating unbalance of a cyclically moving body, said device comprising a resiliently mounted cage, means to rotate said body in said cage at a definite frequency, a reed tuned to said frequency, a circuit containing a condenser and connecting said reed with said body, means to charge said condenser, and means to oscillate said reed by vibrations of said cage, said reed being so positioned that the reed contacts said body at its extreme position of oscillation and thereby momentarily closes said circuit.

4. A device for indicating unbalance of a cyclically moving body, said device comprising a resiliently mounted cage, means to rotate said body in said cage at a definite frequency, a reed tuned to said frequency, two pickups located at points of said cage which are axially remote from each other, said pickups generating electrical signals when said cage vibrates, an amplifier, circuits feeding selectively the signals generated by the one or the other of said pickups to the input of said amplifier, an electromagnet excited by the output of said amplifier and so positioned near said reed that said reed is oscillated by said excited electromagnet, said reed being so positioned near said cage that said reed contacts said body at the extreme position of oscillation, and means to shift said reed in a direction parallel to the axis of rotation of said body.

5. A device for indicating unbalance of a cyclically moving body, said device comprising a resiliently mounted cage, means to rotate said body in said cage at a definite frequency, a reed tuned to said frequency, two pickups located at points of said cage which are axially remote from each other, said pickups generating electrical signals when said cage vibrates, an amplifier, circuits feeding selectively the signals generated by the one or the other of said pickups to the input of said amplifier, means for adjusting the magnitude of said signals relative to the magnitude of said picked up vibrations whereby the signals supplied by one pickup when the vibrations are caused by an unbalance located near the point of its pickup can be made equal to the signals supplied by the other pickup when the vibration is caused by an unbalance of the same amount located near the point of said other pickup, an electromagnet excited by the output of said amplifier and so positioned near said reed that said reed is oscillated by said excited electromagnet, said reed being so positioned near said cage that said reed contacts said body at the extreme position of oscillation, and means to shift said reed in a direction parallel to the axis of rotation of said body.

6. A device for indicating unbalance of a cyclically moving body, said device comprising a resiliently mounted cage, means to rotate said body in said cage at a definite frequency, a reed tuned to said frequency, two pickups located at points of said cage which are axially remote from each other, said pickups generating electrical signals when said cage vibrates, an amplifier, means to adjust the output of said amplifier to a definite magnitude for a definite magnitude of the input, circuits feeding selectively the signals generated by the one or the other of said pickups to the input of said amplifier, means to adjust the magnitude of said fed signals to said definite magnitude of the input whereby the output of said amplifier obtains said definite magnitude of output, means to measure the amount of adjustment necessary for said latter purpose, an electromagnet excited by the output of said amplifier and so positioned near said reed that said reed is oscillated by said excited electromagnet, said reed being so positioned near said cage that said reed contacts said body at the extreme position of oscillation, and means to shift said reed in a direction parallel to the axis of rotation of said body.

7. A device for indicating unbalance of a cyclically moving body, said device comprising a resiliently mounting cage, means to rotate said body in said cage at a definite frequency, a reed tuned to said frequency, two pickups located at points of said cage which are axially remote from each other, said pickups generating electrical signals when said cage vibrates, an amplifier, circuits feeding selectively the signals generated by the one or the other of said pickups to the input of said amplifier, an electromagnet excited by the output of said amplifier and so positioned near said reed that said reed is oscillated by said excited electromagnet, said reed being so positioned near said cage that said reed contacts said body at the extreme position of oscillation, means to shift said reed in a direction parallel to the axis of rotation of said body, and means to adjust the phase of oscillation of said reed relatively to the phase of rotation of said body.

ALBERT G. PEKAR.